United States Patent
Tanaka (10) Patent No.: US 9,656,521 B2
(45) Date of Patent: May 23, 2017

(54) RUN-FLAT TIRE

(75) Inventor: Susumu Tanaka, Kobe (JP)

(73) Assignee: Sumitomo Rubber Industries Ltd., Kobe-shi (JP)

( * ) Notice: Subject to any disclaimer, the term of this patent is extended or adjusted under 35 U.S.C. 154(b) by 373 days.

(21) Appl. No.: 14/342,225

(22) PCT Filed: Sep. 12, 2012

(86) PCT No.: PCT/JP2012/073255
§ 371 (c)(1),
(2), (4) Date: Feb. 28, 2014

(87) PCT Pub. No.: WO2013/047192
PCT Pub. Date: Apr. 4, 2013

(65) Prior Publication Data
US 2014/0224401 A1    Aug. 14, 2014

(30) Foreign Application Priority Data
Sep. 26, 2011    (JP) .................................. 2011-209525

(51) Int. Cl.
B60C 3/00    (2006.01)
B60C 17/00    (2006.01)
B60C 15/06    (2006.01)

(52) U.S. Cl.
CPC ............ *B60C 17/0009* (2013.04); *B60C 3/00* (2013.01); *B60C 2015/061* (2013.04); *B60C 2015/0696* (2013.04); *B60C 2017/0054* (2013.04)

(58) Field of Classification Search
CPC ........ B60C 17/00; B60C 17/0009; B60C 3/00
See application file for complete search history.

(56) References Cited

FOREIGN PATENT DOCUMENTS

| EP | 2 239 154 A1 | 10/2010 |
|---|---|---|
| JP | 10-138719 | 5/1998 |
| JP | 2006-182294 A | 7/2006 |
| JP | 2006-205917 A | 8/2006 |
| JP | 2006-315580 | * 11/2006 |
| JP | 2006-346999 | * 12/2006 |
| JP | 2010-23823 A | 2/2010 |

OTHER PUBLICATIONS

Machine translation of JP 2006-346999, 2006.*
Machine translation of JP 2006-315580, 2006.*
Extended European Search Report issued Jun. 26, 2015 in Patent Application No. 12837547.4.
International Search Report issued in Dec. 11, 2012 in PCT/JP2012/073255 filed Sep. 12, 2012.

* cited by examiner

*Primary Examiner* — Justin Fischer
(74) *Attorney, Agent, or Firm* — Oblon, McClelland, Maier & Neustadt, L.L.P.

(57) ABSTRACT

A run-flat tire includes a carcass including at least one carcass ply, a belt layer, a pair of side reinforcing rubber layers, a pair of bead apex rubber components. A height of the one bead apex rubber component is greater than a height of the other bead apex rubber component. An inner end height of the one side reinforcing rubber layer is greater than an inner end height of the other side reinforcing rubber layer. In a radial region of the tire where at least the bead apex rubber components and the side reinforcing rubber layers are provided, the tire has a same thickness in the respective sides of the bead portions.

20 Claims, 4 Drawing Sheets

FIG.4

RUN-FLAT TIRE

TECHNICAL FIELD

The present invention relates to a run-flat tire that may travel in long distance even when punctured, and more particularly to a run-flat tire that may deliver excellent run-flat performance while preventing deterioration of its uniformity and productivity.

BACKGROUND ART

Conventionally, a run-flat tire that may travel in a certain long distance when punctured (hereinafter, such a traveling is called as "run-flat traveling") is well known. The run-flat tire usually has a side reinforcing rubber layer with a crescent cross-sectional shape in each sidewall portion. In order to improve run-flat performance of the tire, a run-flat tire having a side reinforcing rubber layer with a large volume is proposed. The run-flat tire, however, is liable to deteriorate ride comfort and fuel consumption due to its increased spring constant and mass.

Furthermore, a vehicle usually has rear wheels with a negative camber alignment. Thus, the run-flat tires installed on the rear wheels of the vehicle are subjected to a large tire load on its inboard, and damage tends to concentrate to the inboard of the tire. On the other hand, the run-flat tires installed on the front wheels of a vehicle are subjected to large tire load on its outboard when cornering, and damage tends to concentrate to the outboard of the tire.

In view of above, Japanese Unexamined Patent Application Publication mentioned below discloses a run-flat tire having a pair of side reinforcing rubber layers with different thicknesses, which is intended to install to a vehicle so that the side reinforcing rubber layer with the relatively large thickness is disposed on the side of the wheel where damage tends to concentrate (namely, the inboard of the rear wheels, or the outboard of the front wheels).

RELATED ART DOCUMENTS

Patent Documents

Patent Document 1

Japanese Unexamined Patent Application Publication No. 10-138719

SUMMARY OF INVENTION

Problem to be Solved by the Invention

The run-flat tire described above, however, tends to have a problem of mass balance and uniformity due to its different thicknesses of sidewall portions. Furthermore, the run-flat tire described above may be difficult to mold using a conventional standard bladder, since the run-flat tire has an inner cavity surface of an unsymmetrical shape with respect to its tire equator. Thus, since a special bladder for molding the run-flat tire above is necessary, the run-flat tire tends to have poor productivity.

The present invention has been worked out in light of the circumstances described above, and has a main object of providing a run-flat tire that may deliver excellent run-flat performance while preventing deterioration of its uniformity and productivity.

Means for Solving the Problem

In accordance with the present invention, there is provided a run-flat tire comprising a carcass comprising at least one carcass ply comprising a main portion extending between bead cores each disposed in a first bead portion and a second bead portion, through a tread portion and sidewall portions, and a pair of turn-up portions each turned up around the bead core from the axially inside to the outside of the tire, a belt layer disposed radially outside the carcass in the tread portion, a pair of side reinforcing rubber layers each disposed axially inside the carcass in each sidewall portion, each side reinforcing rubber layer having a crescent cross sectional shape that comprises a center portion with its maximum width and both end portions each extending in a radial direction of the tire with a tapered shape, the side reinforcing rubber layers comprising a first side reinforcing rubber layer disposed in the side of the first bead portion, and a second side reinforcing rubber layer disposed in the side of the second bead portion, a pair of bead apex rubber components comprising a first bead apex rubber component disposed in the first bead portion, and a second bead apex rubber component disposed in the second bead portion, each bead apex rubber component made of rubber having a high hardness and disposed between the main portion and the turn-up portion of the carcass ply in each bead portion so as to extend from its bottom connected with a radially outer surface of the bead core to its radially outer end with a tapered shape, wherein the first bead apex rubber component has a first apex height A1 greater than a second apex height A2 of the second bead apex rubber component, wherein each apex height is defined as a length from a center point on the bottom to the radially outer end in a tire cross section including a tire axis under a standard condition in which the tire is mounted on a standard rim and is inflated to a standard pressure, but no tire load is loaded, wherein the first side reinforcing rubber layer has a first inner end height B1 greater than a second inner end height B2 of the second side reinforcing rubber layer, wherein each inner end height is defined as a radial distance from the radially inner end of the side reinforcing rubber layer to a bead toe of the bead portion, and wherein the tire has a same thickness in the respective sides of the first and second bead portions at a same radial position within a radial region of the tire where at least the bead apex rubber components and the side reinforcing rubber layers are provided.

Effects of the Invention

The run-flat tire in accordance with the present invention includes a pair of bead apex rubber components made of a high hardness rubber, which include a first bead apex rubber component disposed in a first bead portion and a second bead apex rubber component disposed in a second bead portion. The first bead apex rubber component has a height A1 larger than a height A2 of the second bead apex rubber component. Thus, the first bead apex rubber component may reduce deformation of the first bead portion during run-flat traveling. Accordingly, durability and run-flat performance of the tire may be improved by providing the first bead portion to the wheel position of a vehicle where damage tends to concentrate. Furthermore, since the second bead apex rubber component with the relatively low height is disposed in the second bead portion, small mass and low spring constant on the second bead portion may be obtained, thereby improving ride comfort and fuel consumption of the tire.

The run-flat tire in accordance with the present invention comprises a pair of side reinforcing rubber layers that include a first side reinforcing rubber layer disposed in the side of the first bead portion, and a second side reinforcing rubber layer disposed in the side of the second bead portion. The first side reinforcing rubber layer has an inner end height B1 larger than an inner end height B2 of the second side reinforcing rubber layer. Thus, the first side reinforcing rubber layer having the relatively short radial length is provided at the side of the first bead portion where the first bead apex rubber component with the relatively high height A1 is disposed, and the second side reinforcing rubber layer having the relatively large radial length is provided at the side of the second bead portion where the second bead apex rubber component with the relatively low height A2 is disposed. Accordingly, the first bead portion and the second bead portion are well balances in mass so that better uniformity of the tire may be obtained.

Furthermore, the tire has a same thickness in the respective sides of the first and second bead portions at a same radial position within a radial region of the tire where at least the bead apex rubber components and the side reinforcing rubber layers are provided. Accordingly, the run-flat tire in accordance with the present invention may have an inner cavity surface having a symmetrical shape with respect to a tire equator. Since the run-flat tire in accordance with the present invention may be molded using a conventional bladder, better productivity may be achieved.

MODE FOR CARRYING OUT THE INVENTION

An embodiment of the present invention is described in detail below with reference to the accompanying drawings.

Figure 1:
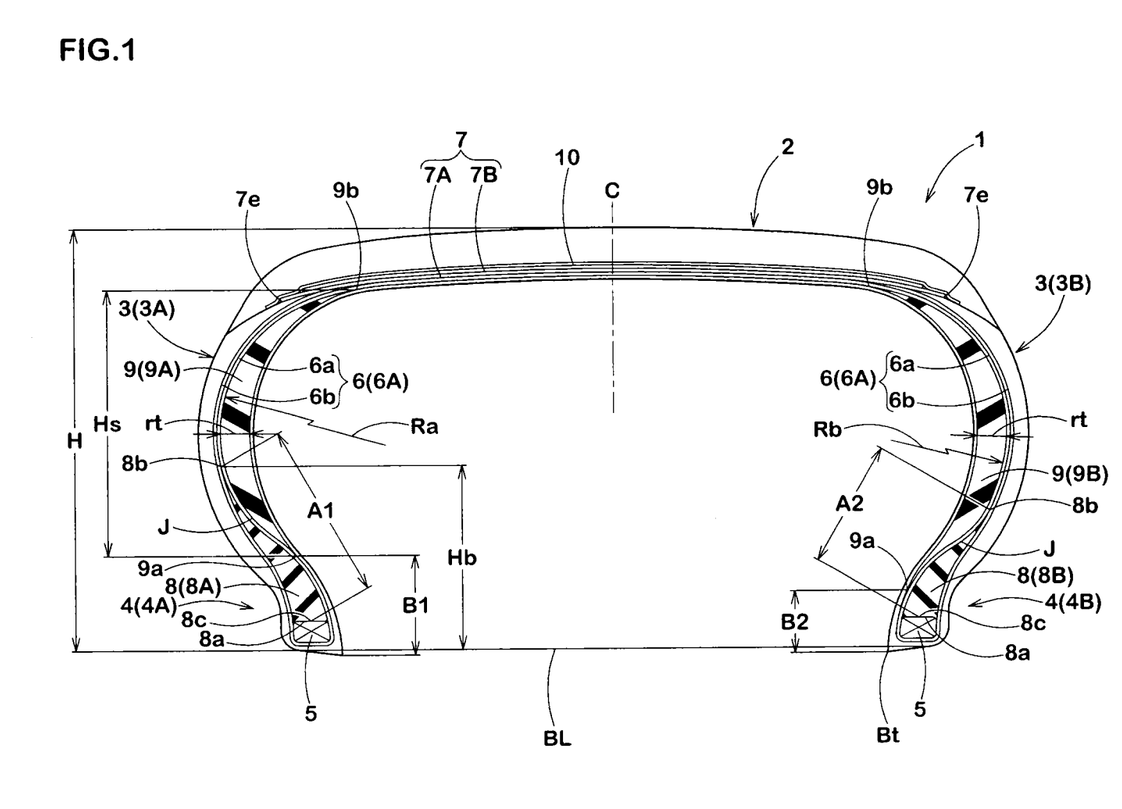
FIG. 1 is a cross-sectional view illustrating a run-flat tire in accordance with an embodiment of the present invention.
Figure 2:
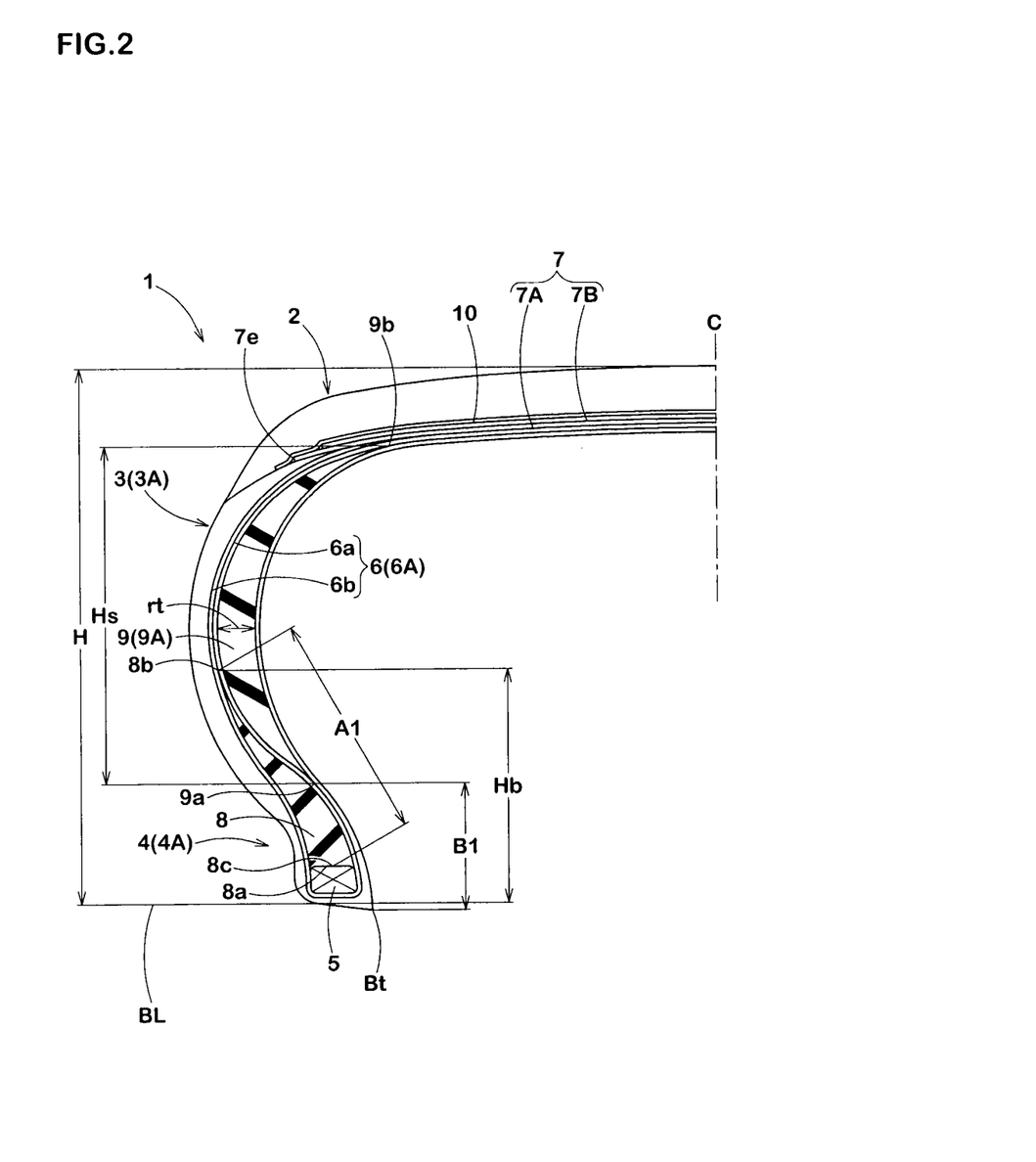
FIG. 2 is an enlarged view illustrating a first bead portion.
Figure 3:
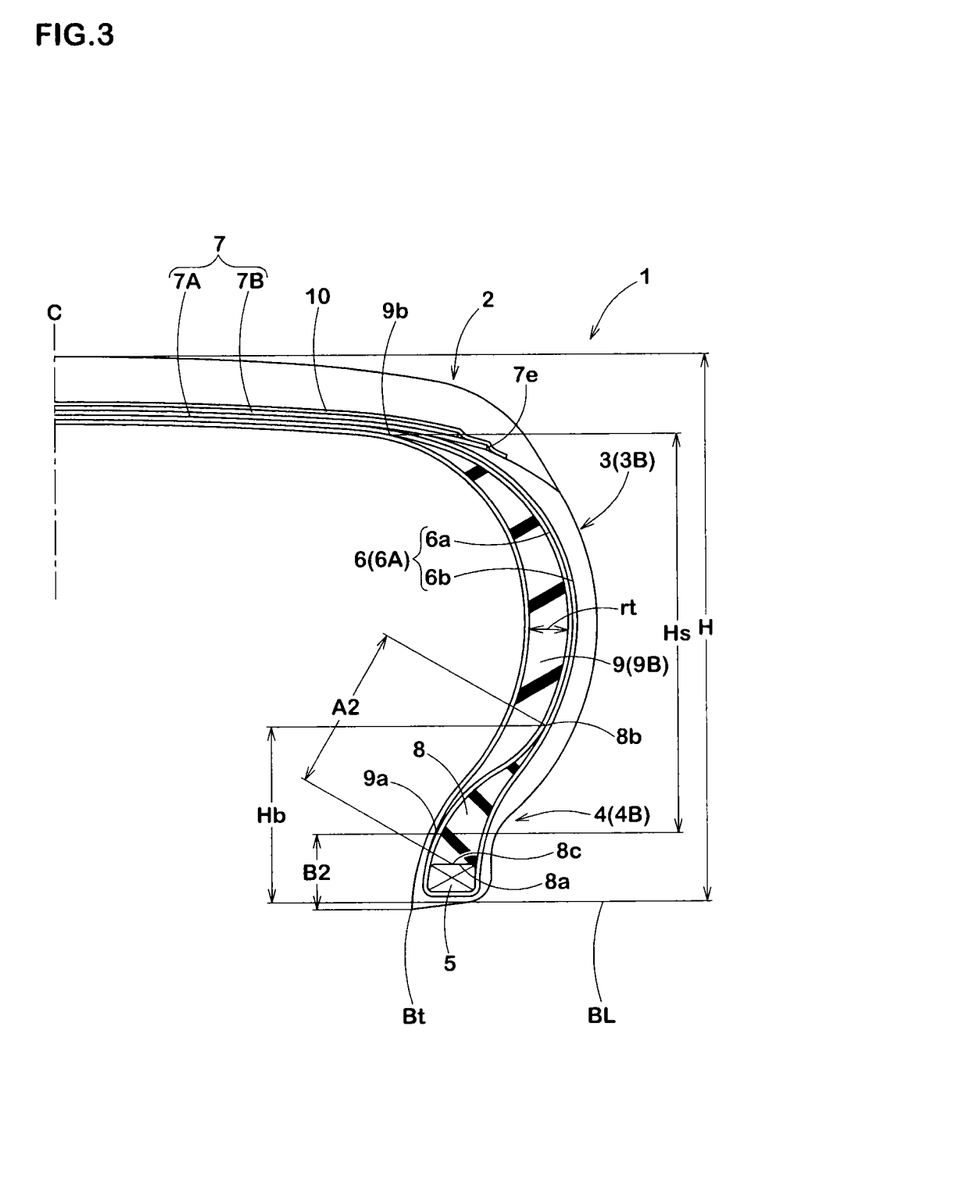
FIG. 3 is an enlarged view illustrating a second bead portion.
Figure 4:
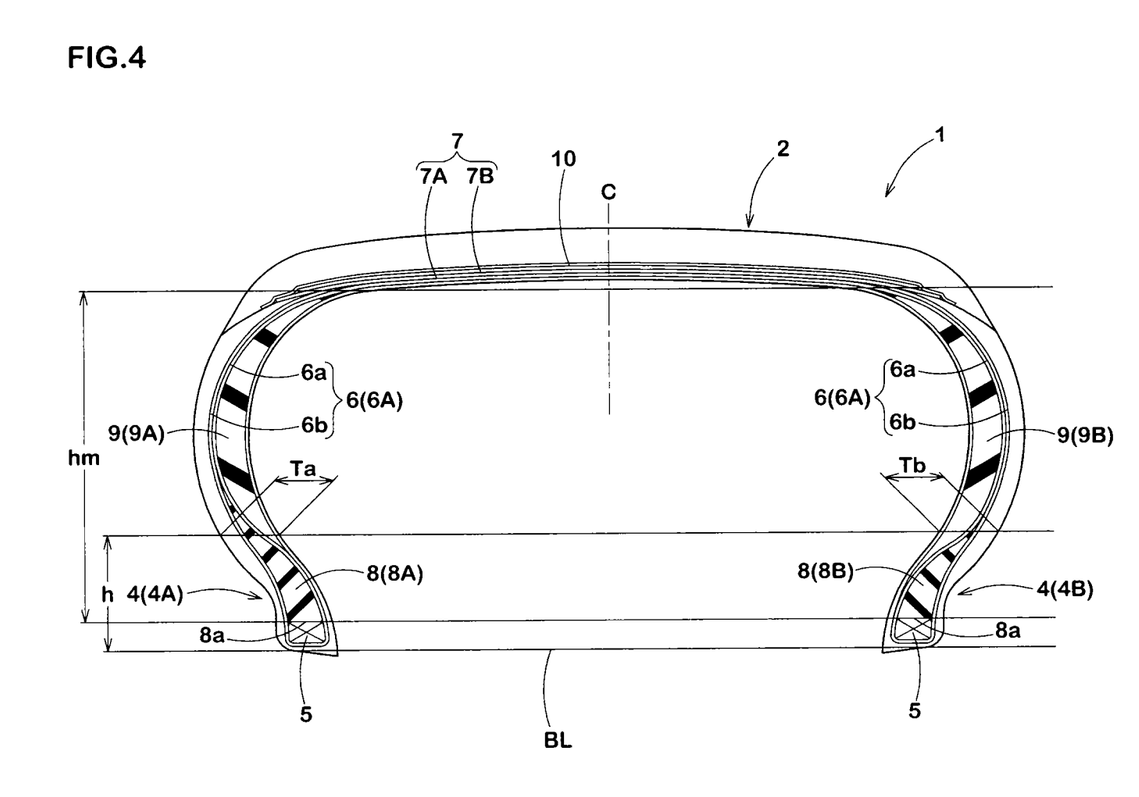
FIG. 4 is a cross-sectional view illustrating the run-flat tire in accordance with an embodiment of the present invention.

FIG. 1 and FIG. 4 each illustrates a cross sectional view of a run-flat tire 1 including a tire axis under a standard condition, in accordance with an embodiment of the present invention. FIG. 2 is an enlarged view illustrating a first bead portion of FIG. 1, and FIG. 3 is an enlarged view illustrating a second bead portion of FIG. 1.

Here, the standard condition is such that the tire 1 is mounted on a standard wheel rim (not shown) and is inflated to a standard pressure but loaded with no tire load. In this application including specification and claims, various dimensions, positions and the like of the tire refer to those under the standard condition of the tire unless otherwise noted.

The standard wheel rim is a wheel rim officially approved for the tire by standards organizations, and the standard wheel rim is the "standard rim" specified in JATMA, the "Measuring Rim" in ETRTO, the "Design Rim" in TRA or the like, for example.

The standard pressure is a pressure officially approved for the tire by standards organizations, and the standard pressure is the "maximum air pressure" in JATMA, the "Inflation Pressure" in ETRTO, and the maximum pressure given in the "Tire Load Limits at Various Cold Inflation Pressures" table in TRA or the like. However, in case of a passenger car tire, the standard pressure is uniformly defined as 180 kPa.

As shown in FIG. 1, the run-flat tire 1 in accordance with the present embodiment includes a carcass 6 extending between bead cores 5 disposed in bead portions 4 through a tread portion 2 and sidewall portions 3, a belt layer 7 disposed radially outside the carcass 6 in the tread portion 2, a pair of bead apex rubber components 8 each tapering radially outwardly from each bead core 5, and a pair of side reinforcing rubber layers 9 each having a crescent cross-sectional shape and disposed axially inside the carcass 6 in each sidewall portion 3. The bead portions 4 include a first bead portion 4A and a second bead portion 4B.

The carcass 6 includes at least one carcass ply 6A of cords which comprises a main portion 6a extending between bead cores 5, 5 through the tread portion 2 and sidewall portions 3, and a pair of turn-up portions 6b each turned up around the bead core 5 from the axially inside to the outside of the tire. The carcass cords are arranged at an angle in the range of from 75 to 90 degrees with respect to a tire equator C. For the carcass cords, organic fiber cords, e.g. polyester, nylon, rayon, aramid and the like are preferably used. For the carcass cords, steel cords may be used.

The turn-up portion 6b of the carcass ply 6A is preferably located more outside than the outer end 8b of the bead apex rubber component 8 in the radial direction of the tire. More preferably, the turn-up portion 6b of the carcass ply 6A is located in between the belt layer 7 and the main portion 6a of the carcass ply 6A. Thus, the bending rigidity of the sidewall portion 3 may effectively be enhanced, thereby further improving run-flat performance.

The belt layer 7 includes at least one belt ply of belt cords laid at an angle in a range of from 10 to 40 degrees with respect to the tire equator C. In this embodiment, the belt layer 7 includes two belt plies 7A and 7B overlapped each other so that each belt cords of plies are crossed. Although steel cords are employed for the belt cords in this embodiment, aramid or rayon cords may be employed.

A band layer 10 having band cords laid at angle of less than 5 degrees with respect to the circumferential direction of the tire is disposed on the belt layer 7.

The bead apex rubber component 8 is disposed between the main portion 6a and the turn-up portion 6b of the carcass ply 6A in each bead portion 4. Each bead apex rubber component 8 has its bottom 8a connected with a radially outer surface of the bead core 5. Each bead apex rubber component 8 extends from the bottom 8a to its radially outer end 8b in a tapered shape.

Since the bead apex rubber components 8 are made of rubber having a high hardness, the bending rigidity of the sidewall portions 3 and bead portions 4 may be enhanced so that the deformation thereto is reduced. In view of above, the bead apex rubber components 8 preferably have a complex elastic modulus in a range of from not less than 5 MPa, more preferably not less than 8 MPa. When the complex elastic modulus is less than 5 MPa, it may be difficult to obtain sufficient run-flat performance. Meanwhile, when the complex elastic modulus is too large, ride comfort during ordinary drive may be deteriorated. Thus, the bead apex rubber components 8 preferably have its complex elastic modulus in a range of from not more than 15 MPa, more preferably not more than 12 MPa.

In this specification and claims, the complex elastic modulus is measured based on JIS-K6394 using a viscoelasticity spectrometer manufactured by Iwamoto Seisakusho Co. under the condition at a temperature of 70 degrees C., frequency of 10 Hz, initial strain of 10%, and amplitude of Dynamic strains of +/−1%.

The bead apex rubber components 8 include a first bead apex rubber component 8A disposed in the first bead portion 4A, and a second apex rubber component 8B disposed in the second bead portion 4B. In this embodiment, the same rubber composition is used for the first and second bead apex rubber components 8A and 8B. Thus, the first bead apex rubber component 8A and the second apex rubber component 8B have the same complex elastic modulus.

As shown in FIGS. 2 and 3, the respective bead apex rubber components 8 preferably have a radial height Hb from the bead base line B1 to its outer ends in a range of not less than 10%, more preferably not less than 25%, in relation to the tire section height H. When the height Hb is less than 10% in relation to the tire section height H, the tire mass may increase and ride comfort may be deteriorated. In view of above, the height Hb is preferably set in a range of from not more than 50%, more preferably not more than 45%, in relation to the tire section height H.

Each side reinforcing rubber layer 9 is disposed axially inside the carcass 6 in each sidewall portion 3. The side reinforcing rubber layer 9 includes a center portion having its maximum width and both end portions tapering from the center portion so as to have a crescent cross-sectional shape. In this embodiment, each side reinforcing rubber layer 9 has a radially inner end 9a being adjacent to axially inside of the bead apex rubber component 8 through the main portion 6a of the carcass ply 6A. Furthermore, each side reinforcing rubber layer 9 has a radially outer end 9b being located in the vicinity of the axially outer edge 7e of the belt layer 7.

Since the run-flat tire having side reinforcing rubber layers 9 may have high bending rigidity, especially at the tire maximum position of the sidewall portion 3, deflection of the sidewall portions 3 during run-flat traveling may be reduced. In order to improve the advantage above, the side reinforcing rubber layers 9 preferably have a complex elastic modulus in a range of not less than 3 MPa, more preferably not less than 6 MPa. On the other hand, a large complex elastic modulus of side reinforcing rubber layer 9 may deteriorate ride comfort during ordinary traveling. In view of above, the complex elastic modulus of the side reinforcing rubber layer 9 is preferably set in a range of not more than 12 MPa, more preferably not more than 9 MPa.

The side reinforcing rubber layers 9 include a first side reinforcing rubber layer 9A disposed in the side of the first bead portion 4A, and a second side reinforcing rubber layer 9B disposed in the side of the second bead portion 4B. In this embodiment, the same rubber composition is used for the first and second side reinforcing rubber layers 9A and 9B. Thus, the respective first side reinforcing rubber layer 9A and the second side reinforcing rubber layer 9B have the same complex elastic modulus.

Preferably, the complex elastic modulus of the bead apex rubber components 8 are set larger than the complex elastic modulus of the side reinforcing rubber layers 9. Thus, ride comfort and steering stability during ordinarily traveling may be improved. Furthermore, run-flat performance of the tire may be further improved, since the sidewall portions 3 are smoothly flexed during run-flat traveling.

The respective side reinforcing rubber layers 9 have a radial length Hs between its radially outer end 9b and inner end 9a in a range of from 35% to 70% in relation to the tire section height H. As the tire for a passenger car, the respective side reinforcing rubber layers 9 of preferably have thicknesses "rt" in a range of from 5 to 20 mm.

In the run-flat tire in accordance with the present invention, the first bead apex rubber component 8A has a first apex height A1 that is a length from a center point 8c on its bottom 8a to its radially outer end 8b, and the second bead apex rubber component 8B has a second apex height A2 that is a length from a center point 8c on the bottom 8a to its radially outer end 8b. The tire in accordance with the present invention has the first apex height A1 of the first bead apex rubber component being greater than the second apex height A2 of the second bead apex rubber component. Furthermore, the outer end 8b of the first bead apex rubber component 8A is positioned within 5 mm in the radial direction of the tire from the tire maximum width position where the side reinforcing rubber layer 9 has its maximum width "rt".

The run-flat tire 1 in accordance with the present invention includes the first bead apex rubber component 8A having the relatively high height disposed in the first bead portion 4A. Thus, the first bead portion 4A may have the relatively high rigidity compared to the second bead portion 4B. Accordingly, the first bead portion 4A is preferably provided at the wheel position of a vehicle where damage tends to concentrate. For instance, the first bead portion 4A is preferably installed to the inboard on the rear wheels, or the outboard on the front wheels. Thus, since the run-flat tire 1 installed to the vehicle above may reduce not only its deformation, but also generation of heat during run-flat traveling, run-flat performance of the tire improves.

The second bead apex rubber component 8B has the relatively low height disposed in the second bead portion 4B. Since the second bead portion 4B may have the relatively low rigidity compared to the first bead portion 4A, the second bead portion 4B is preferably provided at the wheel position of a vehicle where damage does not tend to concentrate. For instance, the second bead portion 4B is preferably installed to the outboard on the rear wheels, or the inboard on the front wheels. Thus, the run-flat tire 1 installed to the vehicle above may have suitable a spring constant and tire mass while maintaining run-flat performance.

In the preferred embodiment, the first apex height A1 of the first bead apex rubber component 8A is set in a range of from 1.25 to 2.0 times in relation to the second apex height A2 of the second bead apex rubber component 8B. Thus, run-flat performance, ride comfort and steering stability during ordinarily traveling may further be improved in well balanced.

Regarding the side reinforcing rubber layer 9, the first side reinforcing rubber layer 9A has the inner end height B1 is larger than the inner end height B2 of the second side reinforcing rubber layer 9B. Here, the respective inner end height B1 and B2 are radial distances from its radially inner end 9a to the bead toe Bt. In this embodiment, the respective radially outer ends 9b of the first and second side reinforcing rubber layers 9A and 9B are provided at the same position with respect to the radial direction of the tire.

Thus, the first side reinforcing rubber layer 9A having the relatively short radial length Hs is provided at the side of the first bead portion 4A where the first bead apex rubber component 8A with a high height A1 is disposed, and the second side reinforcing rubber layer 9B having the relatively large radial length Hs is provided at the side of the second bead portion 4B where the second bead apex rubber component 8B with the relatively low height A2 is disposed. Accordingly, the first bead portion 4A and the second bead portion 4B are well balances in mass so that better uniformity of the tire may be obtained.

In the preferred embodiment as shown in FIG. 1 that is a cross sectional view including the tire axis, a total area of the first bead apex rubber component 8A and the first side reinforcing rubber layer 9A is substantially same with a total area of the second bead apex rubber component 8B and the second side reinforcing rubber layer 9B. Thus, better balance in mass and uniformity may further be obtained.

In the still further preferred embodiment, an absolute value of a difference height {(A1−B1)−(A2−B2)} is not more than 10 mm. Here, "A1" is the first apex height of the first bead apex rubber component 8A, "A2" is the second apex height of the second bead apex rubber component 8B, "B1" is the first inner end height of the first side reinforcing rubber layer 9A, and "B2" is the second inner end height of the second side reinforcing rubber layer 9B. When the absolute value of the difference height {(A1−B1)−(A2−B2)} above is more than 10 mm, uniformity of the tire and ride comfort may be deteriorated. Furthermore, the cavity surface of the tire tends to be formed as an unsymmetrical shape with respect to the tire equator.

The main portion 6a of the carcass ply 6A includes a sandwiched portion J that extends between the side reinforcing rubber layer 9 and the bead apex rubber component 8. The radial length of the sandwiched portion J is adjusted by changing the inner end heights B1 and B2 of the side reinforcing rubber layers 9 in each bead portions 4A and 4B. In the embodiment shown in FIG. 1, the sandwiched portion J on the side of the first bead portion 4A is relatively positioned radially outward with respect to the sandwiched portion J on the side of the second bead portion 4B. Thus, since the profile of the main portion 6a of the carcass ply 6A in the first bead portion 4A has a radius Ra of curvature smaller than a radius Rb of curvature of the profile of the main portion 6a in the second bead portion 4B, tension applied to the cords of the carcass 6 in the first bead portion 4A is lowered so that ride comfort improves. Furthermore, tension applied to the cords of the carcass 6 in the second bead portion 4B is increased so that steering stability improves.

As shown in FIG. 4, in a radial region "hm" of the tire in which at least the bead apex rubber components 8 and the side reinforcing rubber layers 9 are provided, the run-flat tire 1 in accordance with the present invention has the same thicknesses Ta (=Tb) at the same radial position of the tire, at the respective sides of the first and second bead portions. Thus, the run-flat tire 1 in accordance with the present embodiment may have an inner cavity surface having a symmetrical shape with respect to the tire equator C. Thus, since the run-flat tire 1 in accordance with the present embodiment may be molded using a conventional bladder, better productivity may be achieved.

While the particularly preferable embodiments of the present invention have been described in detail, the present invention in not limited to the illustrated embodiments, but can be modified and carried out in various aspects.

Comparison Test

Run-flat tires of 225/55R17 having the basic structure of FIG. 1 except for details shown in Table 1 were made, and tested with respect to its run-flat traveling distance, tire mass, and spring constant. Test methods are as follows.

Run-Flat Traveling Distance Test

Each test tire was mounted on a wheel rim of 17×7J with an inner pressure of 0 kPa without a valve core, and installed to the rear wheel with a camber angle of set to −2 degrees of a FR vehicle with a displacement of 3,500 cc. The test driver drove the vehicle on a test course of 3,500 m long that includes corners of R150 and R110 at a speed of 80 km/h, and measured its runnable distance. The results are indicated in Table 1 by an index based on Ref. 1 being 100, wherein the larger the value, the better the performance is.

Tire Mass Test

Each test tire mass was measured. The results are indicated in Table 1 by an index based on Ref. 1 being 100, wherein the smaller the value, the lighter the mass is.

Spring Constant Test

The vertical deflection of each test tire mounted on the wheel rim above was measured under the inner pressure of 230 kPa and vertical load of 4.7 plus/minus 1.0 kN. Then, the spring constant that is a vertical load per the vertical deflection of 1 mm is calculated. The results are indicated by an index based on Ref. 1 being 100. The smaller the index, the better the ride comfort is.

Uniformity Test

Lateral force variation (LFV) of each test tire was measured using a tire uniformity test machine based on the Method of uniformity test for vehicle tires defined by JASO C607:2000. The results are indicated by an index based on Ref. 1 being 100. The larger the index, the better the uniformity is. The measurement condition was as follows:
Wheel rim size: 17×7J;
Tire rotational speed: 60 rpm;
Internal pressure: 200 kPa; and
Vertical tire load: 4000 kN.

Productivity Test

The productivity of each test tire was evaluated by molding each tire using a tire molding bladder having a symmetrical shape under the following standard:
A: the number of defective products is not more than 0.5%;
B: the number of defective products is more than 0.5%, but not more than 1.0%; and
C: the number of defective products is more than 1.0%.
Test results are shown in Table 1.

TABLE 1

|  | Ref. 1 | Ref. 2 | Ref. 3 | Ref. 4 | Ref. 5 | Ex. 1 | Ex. 2 | Ex. 3 |
|---|---|---|---|---|---|---|---|---|
| First apex height A1 (mm) | 45 | 50 | 45 | 50 | 35 | 45 | 50 | 45 |
| Second apex height A2 (mm) | 45 | 50 | 45 | 50 | 35 | 40 | 35 | 35 |
| Ratio A1/A2 | 1 | 1 | 1 | 1 | 1 | 1.13 | 1.43 | 1.29 |
| Inner end height B1 of first side reinforcing rubber layer (mm) | 30 | 35 | 30 | 35 | 20 | 30 | 35 | 30 |
| inner end height B2 of second side reinforcing rubber layer (mm) | 30 | 35 | 30 | 35 | 20 | 25 | 20 | 20 |

TABLE 1-continued

|  | | | | | | | | |
|---|---|---|---|---|---|---|---|---|
| Complex elastic modulus of bead apex rubber components (MPa) | 8 | 8 | 12 | 12 | 12 | 8 | 8 | 8 |
| Complex elastic modulus of side reinforcing rubber layers (MPa) | 8 | 8 | 8 | 8 | 8 | 8 | 8 | 8 |
| Absolute {(A1 − B1) − (A2 − B2)} (mm) | 0 | 0 | 0 | 0 | 0 | 0 | 0 | 0 |
| Run-flat traveling distance (Index) | 100 | 115 | 115 | 130 | 85 | 100 | 115 | 100 |
| Tire mass (Index) | 100 | 100 | 100 | 100 | 100 | 100 | 100 | 100 |
| Spring constant of tire (Index) | 100 | 110 | 105 | 115 | 95 | 95 | 95 | 90 |
| Uniformity (Index) | 100 | 100 | 100 | 100 | 100 | 100 | 100 | 100 |
| Productivity | A | A | A | A | A | A | A | A |

|  | Ex. 4 | Ex. 5 | Ex. 6 | Ex. 7 | Ex. 8 | Ex. 9 | Ex. 10 | Ex. 11 |
|---|---|---|---|---|---|---|---|---|
| First apex height A1 (mm) | 45 | 50 | 45 | 50 | 50 | 50 | 50 | 50 |
| Second apex height A2 (mm) | 40 | 35 | 35 | 40 | 25 | 40 | 35 | 30 |
| Ratio A1/A2 | 1.13 | 1.43 | 1.29 | 1.25 | 2 | 1.25 | 1.43 | 1.67 |
| Inner end height B1 of first side reinforcing rubber layer (mm) | 30 | 35 | 30 | 30 | 35 | 35 | 25 | 25 |
| inner end height B2 of second side reinforcing rubber layer (mm) | 25 | 20 | 20 | 25 | 10 | 20 | 20 | 20 |
| Complex elastic modulus of bead apex rubber components (MPa) | 12 | 12 | 12 | 8 | 8 | 8 | 8 | 8 |
| Complex elastic modulus of side reinforcing rubber layers (MPa) | 8 | 8 | 8 | 8 | 8 | 8 | 8 | 8 |
| Absolute {(A1 − B1) − (A2 − B2)} (mm) | 0 | 0 | 0 | 0 | 0 | 5 | 10 | 15 |
| Run-flat traveling distance (Index) | 120 | 130 | 120 | 110 | 100 | 150 | 120 | 115 |
| Tire mass (Index) | 100 | 100 | 100 | 100 | 100 | 105 | 103 | 100 |
| Spring constant of tire (Index) | 100 | 100 | 95 | 100 | 90 | 95 | 90 | 90 |
| Uniformity (Index) | 100 | 100 | 100 | 100 | 100 | 100 | 95 | 90 |
| Productivity | A | A | A | A | A | A | B | C |

As shown in Table 1, it was confirmed that the Exs. 1 to 3 reduced its spring constant while maintaining its run-flat traveling distance and tire mass as compared to the Refs. 1 and 2.

Furthermore, it was confirmed that the Exs. 4 to 6 notably improved its run-flat traveling distance, since they were provided with bead apex rubber components with complex elastic modulus larger than that of the side reinforcing rubber layers. Furthermore, it was confirmed that the respective example tires prevented from increase of tire mass and spring constant.

DESCRIPTION OF THE REFERENCE NUMERALS

2 Tread portion
3 Side wall portion
4 Bead portion
5 Bead core
6 Carcass
6a Main portion
6b Turn-up portion
7 Belt layer
8 Bead apex rubber component
9 Side reinforcing rubber layer
10 Band layer

The invention claimed is:

1. A run-flat tire, comprising:
a pair of bead cores comprising a first bead core positioned in a first bead portion of the run-flat tire and a second bead core positioned in a second bead portion of the run-flat tire;
a carcass comprising a carcass ply comprising a main portion extending between the first and second bead cores through a tread portion and sidewall portions of the run-flat tire, and a pair of turn-up portions each turned up around a respective one of the first and second bead cores from the axially inside to the axially outside of the run-flat tire;
a pair of side reinforcing rubber layers comprising a first side reinforcing rubber layer on a first bead portion side and a second side reinforcing rubber layer on a second bead portion side, and each disposed axially inside the carcass in each of the sidewall portions, each of the side reinforcing rubber layers having a crescent cross-sectional shape such that a center portion of each of the side reinforcing rubber layers has the maximum width and end portions each extending in a radial direction of the run-flat tire in a tapered shape; and
a pair of bead apex rubber components comprising a first bead apex rubber component disposed in the first bead portion, and a second bead apex rubber component disposed in the second bead portion, each of the bead apex rubber components being disposed between the main portion and a respective one of the turn-up portions of the carcass ply in a respective one of the bead portions and having a tapered shape such that each of the bead apex rubber components has the bottom connected to a radially outer surface of a respective one of the bead cores and a radially outer end extending from the bottom,
wherein the first bead apex rubber component has a first apex height A1 greater than a second apex height A2 of the second bead apex rubber component measured under a standard condition, the first side reinforcing rubber layer has a first inner end height B1 greater than a second inner end height B2 of the second side reinforcing rubber layer, and the run-flat tire has same thicknesses on the first and second bead portion sides at same radial positions within an entire radial region of the run-flat tire where at least the bead apex rubber components and the side reinforcing rubber layers are positioned such that the run-flat tire has an inner cavity having a symmetrical shape.

2. The run-flat tire according to claim 1, wherein the bead apex rubber components are made of rubber having a high hardness and have a complex elastic modulus greater than a complex modulus of the side reinforcing rubber layers.

3. The run-flat tire according to claim 2, wherein the bead apex rubber components and the side reinforcing rubber layers satisfy that an absolute value of a difference height {(A1−B1)−(A2−B2)} is not more than 10 mm, where A1 is the first apex height A1 of the first bead apex rubber component, A2 is the second apex height A2 of the second bead apex rubber component, B1 is the first inner end height B1 of the first side reinforcing rubber layer, and B2 is the second inner end height B2 of the second side reinforcing rubber layer.

4. The run-flat tire according to claim 3, wherein the first apex height A1 of the first bead apex rubber component is set in a range of from 1.25 to 2.0 times in relation to the second apex height A2 of the second bead apex rubber component.

5. The run-flat tire according to claim 3, wherein the turn-up portions of the carcass ply are extending to positions radially outward with respect to the outer ends of the bead apex rubber components, respectively.

6. The run-flat tire according to claim 3, further comprising:
a belt layer disposed radially outside the carcass in the tread portion,
wherein the turn-up portions of the carcass ply are extending to positions in between the main portion of the carcass ply and the belt layer.

7. The run-flat tire according to claim 2, wherein the first apex height A1 of the first bead apex rubber component is set in a range of from 1.25 to 2.0 times in relation to the second apex height A2 of the second bead apex rubber component.

8. The run-flat tire according to claim 7, wherein the turn-up portions of the carcass ply are extending to positions radially outward with respect to the outer ends of the bead apex rubber components, respectively.

9. The run-flat tire according to claim 2, wherein the turn-up portions of the carcass ply are extending to positions radially outward with respect to the outer ends of the bead apex rubber components, respectively.

10. The run-flat tire according to claim 2, further comprising:
a belt layer disposed radially outside the carcass in the tread portion,
wherein the turn-up portions of the carcass ply are extending to positions in between the main portion of the carcass ply and the belt layer.

11. The run-flat tire according to claim 1, wherein the bead apex rubber components and the side reinforcing rubber layers satisfy that an absolute value of a difference height $\{(A-B1)-(A2-B2)\}$ is not more than 10 mm, where A1 is the first apex height A1 of the first bead apex rubber component, A2 is the second apex height A2 of the second bead apex rubber component, B1 is the first inner end height B1 of the first side reinforcing rubber layer, and B2 is the second inner end height B2 of the second side reinforcing rubber layer.

12. The run-flat tire according to claim 11, wherein the first apex height A1 of the first bead apex rubber component is set in a range of from 1.25 to 2.0 times in relation to the second apex height A2 of the second bead apex rubber component.

13. The run-flat tire according to claim 11, wherein the turn-up portions of the carcass ply are extending to positions radially outward with respect to the outer ends of the bead apex rubber components, respectively.

14. The run-flat tire according to claim 11, further comprising:
a belt layer disposed radially outside the carcass in the tread portion,
wherein the turn-up portions of the carcass ply are extending to positions in between the main portion of the carcass ply and the belt layer.

15. The run-flat tire according to claim 1, wherein the first apex height A1 of the first bead apex rubber component is set in a range of from 1.25 to 2.0 times in relation to the second apex height A2 of the second bead apex rubber component.

16. The run-flat tire according to claim 15, wherein the turn-up portions of the carcass ply are extending to positions radially outward with respect to the outer ends of the bead apex rubber components, respectively.

17. The run-flat tire according to claim 15, further comprising:
a belt layer disposed radially outside the carcass in the tread portion,
wherein the turn-up portions of the carcass ply are extending to positions in between the main portion of the carcass ply and the belt layer.

18. The run-flat tire according to claim 1, wherein the turn-up portions of the carcass ply are extending to positions radially outward with respect to the outer ends of the bead apex rubber components, respectively.

19. The run-flat tire according to claim 1, further comprising:
a belt layer disposed radially outside the carcass in the tread portion,
wherein the turn-up portions of the carcass ply are extending to positions in between the main portion of the carcass ply and the belt layer.

20. The run-flat tire according to claim 18, further comprising:
a belt layer disposed radially outside the carcass in the tread portion,
wherein the turn-up portions of the carcass ply are extending to positions in between the main portion of the carcass ply and the belt layer.

* * * * *